3,476,693
NOVEL EPOXIDES AND CURED POLYMER
COMPOSITIONS OBTAINED THEREFROM
Frank D. Mango, Oakland, and Herbert A. Newey, Lafayette, Calif., assignors to Shell Oil Company, New York, N.Y., a corporation of Delaware
No Drawing. Filed Jan. 24, 1968, Ser. No. 700,041
Int. Cl. C08g 45/00
U.S. Cl. 260—2      14 Claims

ABSTRACT OF THE DISCLOSURE

Cured polymer compositions having improved physical properties are obtained by heating a bis(1,2-epoxyalkyl)-cycloaliphatic compound having at least 5 carbon atoms in the carbocyclic ring thereof with a curing agent. The bis(1,2-epoxy)cycloaliphatic compounds are prepared by epoxidizing the corresponding divinyl cycloalkanes or divinyl cycloalkenes.

BACKGROUND OF THE INVENTION

The excellent and versatile properties of cured epoxy polymer compositions have resulted in their widespread use in many applications such as castings, pottings, sealing, adhesives and laminating and coating formulations. Generally, the properties of a particular cured epoxy polymer composition depend in large part upon the structure and nature of the epoxy monomer or resin precursor. For example, Lee and Neville, "Handbook of Epoxy Resins," McGraw-Hill, New York, 1967, disclose that aromatic ether and aromatic ester groups in epoxy monomers or resin precursors impart good thermal stability to the cured polymer composition and that branch-chain aliphatic epoxy precursors provide cured polymer compositions with low crosslink densities. Similarly, it is apparent that the properties of a cured polymer composition are determined in part by structural parameters of the epoxy precursor such as the distance between crosslinks, the presence or absence of freely rotating groups such as ether linkages, and the presence or absence of hydrocarbyl groups such as aliphatic chains, cycloaliphatic rings and aromatic rings.

SUMMARY OF THE INVENTION

It has now been found that cured polymer compositions having excellent resistance to deformation at high temperatures, excellent resistance to water and improved tensile strength and hardness are obtained by heating certain bis(1,2 - epoxyalkyl)cycloaliphatic compounds having at least 5 carbon atoms in the carbocyclic ring thereof and a conventional curing agent such as an amine or anhydride.

DESCRIPTION OF PREFERRED EMBODIMENTS

Epoxide monomer

Broadly speaking, any bis(1,2-epoxyalkyl)cycloaliphatic hydrocarbon having at least 5 carbon atoms in the ring thereof provides cured polymer compositions with improved physical properties. One class of suitable bis(1,2-epoxyethyl)cycloaliphatic compounds is represented by the Formula I

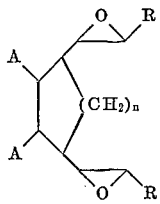

(I)

wherein R independently is hydrogen or methyl, $n$ is a whole number from 1 to 2, inclusive, and the A's taken singly are each hydrogen or taken together form a divalent oxy linkage which together with the adjacent carbon atoms to which said oxy linkage is attached forms an oxirane ring. Illustrative compounds represented by Formula I wherein both A groups are hydrogen are 1,3 - bis(1,2 - epoxyethyl)cyclopentane, 1,3-bis(1,2 - epoxypropyl)cyclopentane, 1 - (1,2 - epoxyethyl) - 3 - (1,2 - epoxypropyl)cyclopentane, 1,4 - bis(1,2-epoxyethyl)cyclohexane, 1,4 - bis(1,2-epoxypropyl)cyclohexane and 1-(1,2 - epoxyethyl)-3-(1,2 - epoxypropyl)cyclohexane. The compounds represented by Formula I wherein both A groups together form an oxy linkage are illustrated by 3,5-bis(1,2-epoxyethyl)cyclopentene - 1,2-oxide, 3,5-bis(1,2-epoxypropyl)cyclopentene - 1,2-oxide, 3-(1,2 - epoxyethyl)-5-(1,2 - epoxypropyl)cyclopentene-1,2-oxide, 3,6-bis(1,2-epoxyethyl)cyclohexene - 1,2-oxide, 3,6-bis(1,2 - epoxypropylcyclohexene - 1,2-oxide and 3-(1,2-epoxyethyl)-6-(1,2 - epoxypropyl)cyclohexene - 1,2-oxide. Particularly preferred epoxide monomers are those represented by Formula A wherein both A groups are hydrogen, i.e., bis(1,2-epoxyalkyl)cyclopentane and bis(1,2-epoxyalkyl)cyclohexane compounds, especially 1,3-bis(1,2-epoxyethyl)cyclopentane.

The epoxides represented by Formula I are prepared by reacting the corresponding ethylenically unsaturated compounds with an epoxidizing agent. Organic peracids, such as peracetic acid, perbenzoic acid, monoperphthalic acid and the like, are preferred agents for the epoxidation. Conventional procedures for epoxidizing ethylenically unsaturated compounds with organic peracids are disclosed by Swern, Org. Reactions, vol. VII, page 378, (1953).

The amount of the epoxidizing agent employed depends upon the number of ethylenic linkages to be epoxidized. In general, at least one mole of the epoxidizing agent is employed for every ethylenic linkage to be epoxidized. It is preferred to carry out the epoxidation in a suitable mutual solvent for the reactants and product. Methylene chloride is especially useful solvent for this purpose, but other materials such as ethyl ether, chloroform, benzene, ethyl acetate, and the like, are also useful. It is generally desirable to maintain the epoxidation temperature between about —20° C. and about 60° C., and more preferably, between 10° C. and 40° C. Atmospheric, superatmospheric or subatmospheric pressures are employed as desired.

The epoxidized products obtained by this method are removed and separated from the reaction mixture by any conventional means, such as distillation, extraction, fractional precipitation, and the like.

Cured products

The epoxides of the invention are cured by the action of a curing ro hardening agent. For this purpose, epoxy curing agents which are acidic or basic are added. Examples of suitable acidic curing agents include: boron trifluoride complexes such as boron trifluoride diethyl etherate, boron trifluoride monoethylamine and boron trifluoride piperidine; Friedel-Crafts metal halides such as aluminum chloride, zinc chloride and ferric chloride; metal salts and oxides such as dibutyltin dilaurate, aluminum stearate, lead naphthenate, zinc stearate, zinc fluoroborate, magnesium perchlorate; phosphoric acid and partial esters thereof including n-butyl ortho-phosphate, diethyl ortho-phosphate and hexaethyltetraphosphate; diphenols such as 1,3-bis(p-hydroxycumyl)benzene; organic acids such as oxalic acid, phthalic acid, maleic acid and aconitic acid; and cyclic anhydrides including aliphatic anhydrides, e.g., succinic anhydride, citraconic anhydride, itaconic anhydride, dodecenylsuccinic anhydride, tricarballylic anhydride, maleic anhydride, hexahydrophthalic anhydride, and chlorendic anhydride, as well as aromatic anhydrides, e.g., phthalic anhydride and trimellitic anhydride.

Suitable basic curing agents include: alkali metal hydroxides such as sodium hydroxide and potassium hydroxide, amine compounds such as primary amines, e.g., aliphatic diamines such as trimethylene diamine; linear and branched aliphatic polyamines such as diethylenetriamine, iminobispropylamine, bis(hexamethylene)triamine, triethylenetetramine, tetraethylpentamine, pentaethylenehexamine, dimethylaminopropylamine, diethylaminopropylamine and aminoethylethanol amine; alicyclic diamines such as menthane diamine, N-aminoethylpiperazine, 1,3-diaminocyclohexane, and isophoronediamine; aromatic primary amines such as meta-phenylenediamine, 4,4'-methylenedianiline, diaminodiphenylsulfone, benzidine, diaminodiphenylether, 4,4'-thiodianiline, 4,4'-bis(o-toluidine), dianisidine, 2,4-toluenediamine, methylenebis(o-chloroaniline) and m-aminobenzylamine; secondary amines such as diethanolamine, piperidine, dibutylamine, dioctylamine, and tetrahydropyridine; tertiary amines such as benzyldimethylamine, benzyldiethylamine, triethylamine, dimethylethanolamine, diethylethanolamine, triethanolamine, N-methylmorpholine, hexamethylenetetramine, N,N-dimethylpiperazine and triethylenediamine; heterocyclic amines such as pyridine, pyrazine, quinoline and lower alkyl-substituted imidazoles, e.g., 2,4-dimethylimidazole, 2-ethyl-4-methylimidazole, 2-propyl-4-butylimidazole and 2,4-dibutylimidazole.

Preferred curing agents are anhydrides, especially aliphatic cyclic anhydrides, primary amines, especially aromatic primary amines, and lower alkyl-substituted imidazoles.

The amount of curing agent depends upon the type of agent selected. In general, the polymer composition comprises at least 0.8 equivalent of epoxy group of the epoxide monomer for each equivalent of curing agent, an equivalent of curing agent being that sufficient to furnish one reactive curing group, e.g., active hydrogen or carboxylic acid or anhydride group or the like, for each epoxy group of the epoxide monomer. Equivalent ratios of curing agent to epoxy group of the epoxide monomer varying from about 0.001:1 to about 1:0.8 are satisfactory, depending upon the type of curing agent employed. Tertiary amines, boron trifluoride complexes, Friedel-Crafts metal halides and like curing agents with no active hydrogen atoms are termed catalytic curing agents and are preferably employed in equivalent ratios to epoxy group of the epoxide monomer of from about 0.001:1 to about 0.1:1. Imidazole curing agents are also preferably employed in equivalent ratios to epoxide compound of from about 0.001:1 to about 0.1:1. The primary and secondary amines, acids and anhydrides are preferably employed in at least 0.6 equivalent per equivalent of epoxy group in the epoxide monomer. Generally, equivalent ratios of primary and secondary amines, acids and anhydrides to epoxy group of the epoxide monomer varying from about 0.6:1 to about 1:0.8 are satisfactory.

The curing of the epoxide compounds is typically accomplished by mixing the desired curing agent in the appropriate amount with the epoxide compounds of the invention and heating. With less active curing agents, e.g., anhydrides, it is convenient to initiate the curing reaction with small amounts, e.g., from about 0.001 to about 0.1 mole percent based on epoxide compound, of a reactive curing agent such as a tertiary amine. Temperatures employed will vary from about 30° C. to as high or higher than 250° C.

The cured products of the invention are utilized for a variety of applications because of their superior physical properties. The cured products are suitable for use in preparing coating compositions, impregnating and sealing compositions, foams, pottings, castings, adhesives and the like. The superior water resistance and tensile and compressive strengths of the cured products render them particularly useful for laminating glass fibers, especially for use in aircraft because of the high strength to weight ratio and weather resistance needed in such an application. Conventional methods for fabricating and laminating glass fibers are described by Lee and Neville, "Handbook of Epoxy Resins," McGraw-Hill, New York, 1967.

The epoxide monomers of invention possess excellent fluidity, and, therefore, in addition to their utility for preparing valuable cured products, are useful as reactive diluents for epoxy resins. In such applications, the utility of the epoxide compound lies primarily in its ability to modify the viscosity of epoxy resins and is due to physical attributes, i.e., the epoxy functional groups, that are inherent in the structure; no chemical changes are required to produce the properties necessary as a diluent for epoxy resins. The utility of epoxy compounds as diluents for epoxy resins is also discussed by Lee and Neville in the "Handbook of Epoxy Resins."

To further illustrate epoxides and cured compositions of the invention, the following examples are provided. It should be understood that the details thereof are not to be regarded as limitations as they may be varied as will be understood by one skilled in this art.

Example I.—1,3-divinylcyclopentane and 3,5-divinylcyclopentene were prepared by the reaction of bicyclo(2.2.1)hept-2-ene and bicyclo(2.2.1)hepta-2,5-diene, respectively, with ethylene over a cobalt molybdate catalyst composition as described below.

A commercial cobalt molybdate-on-alumina catalyst of 8.5% wt. molybdenum and 2.1% wt. cobalt, calculated as metal on the support, was contacted with an aqueous potassium hydroxide solution for one hour to ion exchange 1–2% wt. of potassium, calculated as metal on the support, into the catalyst composition. The catalyst composition was oven-dried at 130° C. for one hour, activated by heating at 500–550° C. under nitrogen or oxygen for 3–18 hours and then brought to room temperature under oxygen-free nitrogen.

The bicyclo(2.2.1)hept-2-ene or bicyclo(2.2.1)hepta-2,5-diene was fed as a 1:1 mixture with cyclohexane into a tubular reactor containing the catalyst while the ethylene reactant was maintained at a pressure of 1000 p.s.i.g. The cyclic olefinic reactant employed, the rate of the addition thereof expressed in weight hourly space velocity (WHSV), the reaction temperature, the conversion of the cyclic olefinic reactant and the product formed are listed in Table I.

TABLE I

| Cyclic Olefin | WHSV | Temp., °C. | Conv., Percent | Product |
|---|---|---|---|---|
| Bicyclo(2.2.1)-hept-2-ene | 0.4 | 100 | >90 | 1,3-divinylcyclopentane. |
| Bicyclo(2.2.1)-hepta-2,5-diene | 1.0 | 150 | 18 | 3,5-divinylcyclopentene. |

By a procedure similar to that described above, good yields of 1,4-divinylcyclohexane and 3,6-divinylcyclohexene are obtained by the reaction of bicyclo(2.2.2)oct-2-ene and bicyclo(2.2.2)octa-2,5-diene, respectively, with ethylene.

Example II.—By a procedure similar to that described in Example I, a product mixture comprising 1-vinyl-3-(1-propenyl)cyclopentane and 1,3-bis(1-propenyl)-cyclopentane was obtained by the reaction of bicyclo(2.2.1) hept-2-ene and propylene over the cobalt-molybdate catalyst composition employed in Example I. The identity of the 1-vinyl-3-(1-propenyl)-cyclopentane and 1,3-bis(1-propenyl)cyclopentane products was determined by mass spectroscopic and nuclear magnetic resonance techniques.

By a procedure similar to that described above, good yields of 1,4-bis(1-propenyl)cyclohexane and 1-vinyl-4-(1-propenyl)cyclohexane are obtained by the reaction of bicyclo(2.2.2)oct-2-ene with propylene.

Example III.—A mixture of 974 g. of 40% peracetic acid and 94.8 g. of 20% aqueous sodium acetate was added over 1 hour to a solution of 284 g. of 1,3-divinylcyclopentane in 2840 ml. of chloroform contained reaction vessel and maintained at a temperature of from 20 to 25° C. with an ice water bath. The course of the epoxidation was followed by measuring the peroxide value of aliquots taken every hour. After 6 hours the peroxide value no longer appeared to be changing and the reaction was discontinued. The reaction mixture was neutralized with saturated aqueous sodium bicarbonate. The chloroform phase was separated and the aqueous phase was extracted with chloroform. The combined chloroform phases were washed several times with sodium bicarbonate solution, once with water and then dried over magnesium sulfate. The chloroform was removed with a rotary evaporator and the residual oil was distilled under vacuum to give 167 g. of 1,3-divinylcyclopentane diepoxide, B.P. 129–131° C. at 20 mm. Hg.

|  | Found | Theory |
|---|---|---|
| Analysis: |  |  |
| C, percent wt | 70.15 | 70.13 |
| H, percent wt | 9.16 | 9.10 |
| Epoxide Value | 1.26 | 1.29 |

By a procedure to that above, good yields of the diepoxide of 1-vinyl - 3 - (1-propenyl)cyclopentane, 1,3-bis(1-propenyl)cyclopentane and 1,4-divinylcyclohexane, and the triepoxide of 3,5-divinylcyclopentane are obtained.

Example IV.—A mixture of 119.4 g. of 1,3-bis(1,2-epoxyethyl)cyclopentane and 40.6 g. of meta-phenylenediamine was heated at a temperature of 65° C. for 2 hours, 80° C. for 18 hours, and then at a temperature of 160° C. for 6 hours. The cured product was a hard, insoluble, infusible polymer.

The heat distortion temperature of cured product was then determined and compared with the heat distortion temperature of two commercially available epoxy resin compositions cured with meta-phenyldiamine under identical conditions. The result is provided in Table II.

TABLE II

| Epoxide Compound (Cured with Meta-phenylenediamine) | Heat Distortion Temperature. ° C. |
|---|---|
| 1,3-bis(1,2-epoxyethyl)cyclopentane | 228 |
| 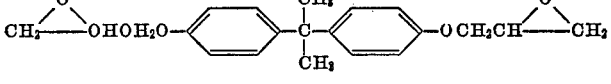 (Epon 828, manufactured by Schell Chemical) | 151 |
| 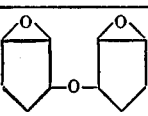 (ERLA 0400, manufactured by Union Carbide) | 199 |

The tensile, flexural and compressive strengths of the cured product were determined. For comparison, the corresponding properties of Epon 828 cured with meta-phenyldiamine were also determined. The results are provided in Table III.

TABLE III

|  | 1,3-bis(1,2-epoxyethyl)-cyclopentane | Epon 828 |
|---|---|---|
| Tensile Properties: |  |  |
| Break, p.s.i | 16,390 | 12,890 |
| Modulus, p.s.i. ×10⁻⁵ | 5.35 | 4.62 |
| Elongation, percent yield, break | 6.53 | 6.53 |
| Flexural Properties: |  |  |
| Break, p.s.i | 24,100 | 20,450 |
| Modulus, p.s.i. ×10⁻⁵ | 5.70 | 4.67 |
| Compressive Properties: Break, p.s.i | 31,700 | 20,530 |

The water absorption of the cured product was also determined and found to be 0.45% after 7 days immersion in water and 0.98% after 28 days immersion in water.

Example V.—A mixture of 20 g. of 1,3-bis(1,2-epoxyethyl)cyclopentane, 39.8 g. of hexahydrophthalic anhydride and 0.2 g. of benzyldimethylamine was heated at a temperature of 80° C. for 6 hours and then at 140° C. for 4 hours. The product had a heat distortion temperature of 143.2° C.

Example VI.—A mixture of 2.5 g. of 1,3-divinylcyclopentane and 0.1 g. of 2-ethyl-4-methylimidazole was heated at a temperature of 80° C. for 4 hours and then at a temperature of 150° C. for 2 additional hours. The resulting product was a hard, tough, cross-linked product as established by a Barcol hardness value of 34 at a tempearture of 25° C.

We claim as our invention:

1. Insoluble, infusible polymer compositions obtained by heating an epoxide monomer of the formula

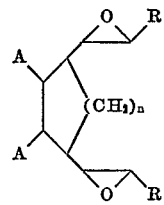

wherein R independently is hydrogen or methyl, n is a whole number from 1 to 2, inclusive, and the A's taken singly are hydrogen or taken together form a divalent oxy linkage which together with the adjacent carbon atoms to which said oxy linkage is attached forms an oxirane ring, in the presence of a curing agent, the equivalent ratio of the epoxide monomer to curing agent being at least 0.8.

2. The insoluble, infusible homopolymer compositions of claim 1 wherein the curing agent is an imidazole, said imidazole being present in equivalent proportions to epoxy groups of the epoxide monomer of from about 0.001:1 to about 0.1:1.

3. The insoluble, infusible homopolymer composition of claim 1 wherein the imidazole curing agent is 2-ethyl-4-methylimidazole.

4. The insoluble, infusible homopolymer composition of claim 3 wherein A and R are hydrogen and n is 1.

5. The insoluble, infusible polymer composition of claim 1 wherein the curing agent is a primary or secondary amine, said amine being present in equavilent proportions to epoxy groups of the epoxide monomer of from about 0.6:1 to about 1:0.8.

6. The insoluble, infusible polymer composition of claim 5 wherein the amine curing agent is meta-phenylenediamine.

7. The insoluble, infusible polymer composition of claim 6 wherein A and R are hydrogen and n is 1.

8. The insoluble, infusible polymer composition of claim 1 wherein the curing agent is a cyclic anhydride, said anhydride being present in equivalent proportions to epoxy groups of the epoxide monomer of from about 0.6:1 to about 1:0.8.

9. The insoluble, infusible polymer composition of claim 8 wherein the anhydride is hexahydrophthalic anhydride.

10. The insoluble, infusible polymer composition of claim 9 wherein A and R are hydrogen and $n$ is 1.

11. Epoxides of the formula

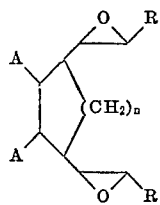

wherein R independently is hydrogen or methyl, $n$ is a whole number from 1 to 2 inclusive, and the A's taken singly are hydrogen or taken together form a divalent oxy linkage which with the adjacent carbon atoms to which said oxy linkage is attached forms an oxirane ring.

12. Epoxides of claim 11 wherein A is hydrogen.
13. Epoxides of claim 12 wherein R is hydrogen.
14. Epoxides of claim 13 wherein $n$ is 1.

References Cited

UNITED STATES PATENTS

| | | | |
|---|---|---|---|
| 2,912,389 | 11/1959 | Phillips et al. | 260—2 |
| 2,918,444 | 12/1959 | Phillips et al. | 260—31.2 |
| 3,251,861 | 5/1966 | Kirchhof et al. | 260—348 |

HAROLD D. ANDERSON, Primary Examiner

E. NIELSON, Assistant Examiner

U.S. Cl. X.R.

117—161; 156—330; 161—184, 185; 260—2.5, 348